United States Patent Office 3,340,012
Patented Sept. 5, 1967

3,340,012
HYDROGEN PRODUCTION IN A FLUIDIZED BED OF ATTRITION RESISTANT CATALYST
Reno W. Moehl, Evanston, Ill., assignor to Universal Oil Products Company, Des Plaines, Ill., a corporation of Delaware
No Drawing. Filed Dec. 19, 1963, Ser. No. 331,958
3 Claims. (Cl. 23—212)

This invention relates to improved means for effecting hydrogen production and in particular to the use of an improved attrition resistant catalyst composite adapted to effect the decomposition of a hydrocarbon stream to produce high yields of hydrogen in a fluidized system.

Hydrocarbon oils and gases, such as are readily and abundantly available as a result of petroleum processing, are an excellent source of hydrogen and a considerable number of processes have been designed to effect the conversion of said hydrocarbons to hydrogen. The normally gaseous hydrocarbons, such as methane, because of the high ratio of hydrogen to carbon, are considered to be a particularly attractive source of hydrogen. The decomposition of hydrocarbons to hydrogen has been effected at high temperature decomposition conditions in the presence of supported iron group metals. It is generally considered that higher conversions are most readily attained through the combined effect of an acid-acting cracking catalyst, such as silica-alumina, as a supporting material. However, it has now been determined that a catalyst consisting of alumina, which is comparatively neutral, and a metal of Group VIII, and in particular, nickel, exhibits considerably greater activity with respect to the decomposition of normally gaseous hydrocarbons to hydrogen than does a catalyst consisting of silica-alumina and nickel. In other words, the comparatively neutral alumina unexpectedly imparts a higher degree of activity to the catalyst than does the acid-acting high silica content silica-alumina catalyst, and this is so despite the recognized superiority of silica-aluminas as gas oil-cracking catalysts.

In carrying out a continuous hydrogen producing operation on a commercial scale it is advantageous to utilize a fluidized or moving bed system to effect an efficient catalytic contact with the hydrocarbon stream. It is also of advantage to provide for the continuous fluidized transporting of the catalyst particles from the reaction zone to the regeneration zone, or carbon removal zone, and from the latter back to a reaction zone; however, it has been found that most of the alumina base catalysts are more susceptible to rapid attrition in a fluidized bed type of conversion system and that the catalyst loss may be too high for a successful commercial use. As a result, substantial research and experimental work has been undertaken to improve the strength or attrition resistance characteristics of a decomposition catalyst composite utilizing a carrier material which is substantially all alumina.

It has now been found that a consistently satisfactory, hard and attrition resistant catalyst carrier particles of alumina, in a finely divided form, can be obtained by the formation of the particles while the alumina is in a "pseudoboehmite" state. Such state may be defined as one which is a variant hydrate of alumina, intermediate between amorphous alumina and boehmite, the latter being the alpha-alumina monohydrate (alpha-$Al_2O_3 \cdot H_2O$).

For reference purposes it may be noted that there are various types of alumina hydrates which can be prepared.

Alpha-$Al_2O_3 \cdot 3H_2O$ or bayerite is formed by aging boehmite in a cold basic solution, but is unstable and gradually is transformed into gibbsite.

Gamma-$Al_2O_3 \cdot 3H_2O$ or gibbsite is a stable form of alumina and may be prepared by aging boehmite in a cold basic solution.

Alpha-$Al_2O_3$, known as corundum, is a hard dense form stable at temperatures over 1800° F.

The boehmite form is the usual type of alumina obtained from the synthetic preparation thereof, and calcining or aging of the boehmite form effects its transformation to the stable gibbsite or "gamma" form. For example, ammonium hydroxide is added to a water solution of aluminum chloride or of aluminum nitrate and an amorphous alumina floc is precipitated which grows in crystal size to the crystalline boehmite state upon subsequent washing and heating treatments or aging. For pilled or pellet forms of catalyst, the rapid crystal growth may be a desirable result, but where the alumina is desired to be in a powder or micro-spherical form, for use in a continuous fluidized system, and prepared by a spray drying or spin drying step from an aqueous slurry of the alumina precipitate, then the material must have attrition resistance to be able to withstand high circulation rates. The spray drying of a slurried boehmite, bayerite, or gibbsite form of alumina has definitely been found to result in a very poor strength material. It appears that where the crystalline structure is large or substantially fixed at the time of the spray drying of the alumina into fine particles, there is a white, chalky nature to such particles and rapid attrition to resulting finished catalyst when used in a fluidized conversion system.

Conversely, as noted hereinbefore, where the spray drying is carried out with alumina which is not in a full crystalline state, as for example, in the pseudoboehmite state, then the resulting comminuted alumina particles after calcination are of a hard resistant nature. It appears that they undergo a physical change subsequent to their formation and acquire both further crystallization and hardness at the same time.

At the present time, it appears that the literature recognizes the pseudoboehmite form of alumina as one which has a crystallite size of the order of 25 to 30 Angstroms which is approximately half the usual laboratory prepared boehmite crystallite size of 55 to 60 Angstroms. Surface area for the pseudoboehmite will also be about twice that of boehmite and in the range of 300 to 350 square meters per gram. In X-ray diffractometer scanning of pseudoboehmite, it is found that there is a shift of certain peaks toward lower angles, due to less intensities from crystalline structure. In other words, the most intense peak for pseudoboehmite will shift say about 1° to 2° $2\theta$ as compared with boehmite and the identification of such pseudoboehmite form is made on this basis.

It is an object of the present invention to provide an improved hydrogen producing system utilizing an improved attrition resistant alumina-nickel catalyst composite for the decomposition of a hydrocarbon stream for the purpose of obtaining an optimum circulating catalyst conversion system.

It is also a particular object of the invention to provide an improved and harder hydrocarbon decomposition catalyst suitable for use in a fluidized hydrocarbon conversion system by forming finely divided alumina carrier particles from an alumina gel or slurry while the alumina hydrogel is in a non-crystalline state.

Thus, broadly the present invention embodies a process for the fluidized production of hydrogen in a manner which comprises contacting a normally gaseous hydrocarbon stream at decomposition conditions with an attrition resistant nickel-alumina catalyst composite consisting substantially of finely divided alumina particles as a base and which particles have been formed while the alumina is in a pseudoboehmite state.

In a more specific embodiment, the invention embodies an optimum method for effecting the decomposition of a hydrocarbon stream in a fluidized system to produce hydrogen and carbon which comprises, contacting said stream at decomposition conditions with catalyst composite substantially of finely divided nickel activated attrition resistant alumina particles and which particles have been comminuted or formed from an alumina precipitate maintained in a pseudoboehmite state, whereby subsequent heating or calcining permits of the formation of a hard attrition resistant alumina for said catalyst composite.

The present invention may also be considered to be directed to an improved method for preparing an active decomposition catalyst with an essentially all-alumina base which is of a hard attrition resistant nature, as well as directed to hydrogen production in accordance with the process of this invention, where a normally gaseous hydrocarbon stream is contacted in a fluidized system with a catalytic composite of substantially alumina base particles and a metal of Group VIII of the Periodic Table, preferably nickel, where the alumina particles have been formed from an alumina hydrogel precipitate while maintained in a pseudoboehmite state to provide resulting finished carrier particles of a hard attrition resistant nature.

A normally gaseous hydrocarbon stream as referred to herein, relates to natural gas or refinery "off-gas" comprising principally methane, but also including minor quantities or ethane, ethylene, propane, propylene, butane, isobutane, butylene, isobutylene, etc. While optimum conversion to hydrogen results from the treatment of a normally gaseous hydrocarbon in accordance with the present invention, like treatment of heavier hydrocarbons will also result in the conversion thereof to hydrogen although not necessarily to the same or an equivalent extent.

It is to be understood that while the improved alumina prepared as set forth herein serves as an attrition resistant catalyst support, its value also lies in its contribution to the over-all activity of the catalyst composite of this invention with respect to the decomposition of normally gaseous hydrocarbons to hydrogen. The activity of the catalyst composite may in part result from an independent effect exerted by the alumina, or more preferably the activity may result by reason of a peculiar association of the alumina with the activating metal to give a catalytic composite of improved catalytic characteristics. Disregarding catalyst hardness or attrition resistance and considering conversion efficiency only, then the alumina base may be synthetically prepared or obtained as a naturally occurring alumina such as is recovered from bauxite; however, from the practical aspects of operating a fluidized hydrogen producing system, the alumina must be of a hard attrition resistant type.

In preparing the improved attrition resistant alumina for use as a catalyst base for ultimate use in a fluidized or moving bed system, there are various modifications in the processing steps which are followed to insure the formation of pseudoboehmite alumina particles.

One particularly advantageous step resides in the controlled washing of the alumina precipitate prior to the formation thereof into an aqueous slurry which is comminuted into the desired subdivided particles. Prior washing operations have generally been carried out in multiple stages to insure the substantially complete removal of acid ions, as for example the chloride or nitrate ions which are in the alumina floc at the time of precipitating amorphous alumina from an aluminum chloride or an aluminum nitrate salt solution. A substantially complete removal of the ions has been found to cause relatively rapid crystal growth within the alumina such that boehmite state is attained in a short period of time by aging or by heating. Conversely, the present improved operation for providing attrition resistance effects a controlled washing where residual acid ions, depending upon the salt from which the material is prepared, remain in combination with the alumina at the time of preparing a slurry feed for spray drying. The amount of acid ion may vary from about 0.20 to about 0.30 percent of the hydrogel, depending upon the time involved between the formation of the alumina precipitate and the initiation of the actual comminuting operation. In other words, where the manufacturing steps are carried out in a sequential manner leading to the spray drying operation within but a matter of a few hours after the alumina floc formation and washing steps, then there may be a relatively low percentage of acid ion left in the slurry as it is fed to the spray drying equipment. However, on the other hand, where the time period between the alumina precipitation step and the spray drying step is lengthened and becomes greater than about 10 or 12 hours, then the acid ion content is preferably in the range of about 0.30 percent of the amorphous alumina precipitate at the time of preparing such precipitate as an aqueous slurry for the comminution step.

Another advantageous procedure for controlling crystallite formation of the amorphous alumina precipitate resides in the regulation of temperature during the washing steps as well as during the precipitation of the alumina floc from the aluminum salt by the ammonium hydroxide solution. In other words, the precipitation step may be carried out at a temperature below the normal room temperature and down to the order of about 40° F., so as to reduce the tendency for crystal growth in the alumina hydrogel. Subsequently, instead of effecting the usual six or seven washing stages, for the purification and elimination of acid ions from the precipitate, that are carried out at slightly elevated temperatures of about 100° F., there may be a stirring and washing of the precipitate in each of the successive washing stages at a temperature equivalent to about room temperature or at a lower temperature down to the order of approximately 40° F., to likewise reduce the tendency for crystallite growth in the alumina hydrogel.

The separate controlled steps with respect to leaving residual acid ions in the slurry and temperature control during precipitation and/or during the washing stages may be utilized independently or in combination with one another to in turn provide the desired pseudoboehmite state for the alumina charge for slurry and and spray drying, whereby the desired attrition resistance is attained in the final carrier material or finished catalyst, subsequent to impregnation and calcination.

The following examples are presented to illustrate the process of this invention, however, such examples are for the purpose of illustration only and are not intended as a limitation in any manner on the generally broad scope of this invention. The catalysts which were utilized to illustrate their conversion effeciency for the process of this invention were subjected to a testing procedure whereby a technical grade of methane was processed over the selected catalyst located in a fixed bed of a vertical tubular reactor. The methane was processed over the catalyst composite at a gas hourly space velocity of about 600 and at a temperature of about 1600° F. for a period of 15 minutes followed by about a 5 minute nitrogen purge. Thereafter, the catalyst composite was regenerated in situ by substantially completely burning the carbon therefrom by means of air oxidation followed by a nitrogen purge. This cycle was repeated one or more times as considered necessary to determine catalyst activity. Each cycle was preceded by a hydrogen purge to reduce the metal component of the catalyst composite previously exposed to oxidation during regeneration. This reduction step would be obviated in commercial practice by maintaining a minimum carbon level on the catalyst composite during regeneration thereof. Product analysis was by gas-liquid chromatography and by means of a Liston Becker non-dispersive infra-red analyzer, with the hydrogen measurements by the former and unreacted methane by the latter.

*Example I*

An equilibrium fluid catalytic cracking catalyst comprising a silica-alumina composite containing about 84% silica and about 16% alumina was immersed in an aqueous solution of nickel nitrate and the mixture was evaporated to dryness in a rotary steam dryer. The resulting composite was calcined at a temperature of about 1400° F. The calcined catalyst composite contained 10% nickel. This silica-alumina-nickel composite was subjected to 3 cycles of the aforementioned test procedure. The average conversion of methane to hydrogen per cycle was 82% at the 2 minute mark and 45% at the completion of the 15 minute processing period.

*Example II*

A quantity of granular calcined alumina (commercially known as Filtrol Grade 90) was immersed in an aqueous solution of nickel nitrate and the mixture was evaporated to dryness in a rotary steam dryer. The resulting composite was calcined at a temperature of about 1400° F. The calcined catalyst composite contained 10% nickel. This alumina-nickel composite was subjected to 4 cycles of the aforementioned test procedure. The average conversion of methane to hydrogen per cycle was 92% at the end of the 15 minute processing period.

A comparison of the foregoing examples shows, in a typical manner, the superiority of the all alumina catalyst carrier for effecting the hydrogen producing conversion.

*Example III*

An alumin gel precipitate was prepared by room temperature precipitation of aluminum chloride with ammonium hydroxide being added to provide a pH of about 8.1. The filtered precipitate was washed six times by separate stirrings and filterings in six successive steps with weakly ammoniated room temperature water. The chlorine content within the filter cake of alumina after the six washings was found to be 0.01 percent by weight. The total volatile matter was measured as 92.0% by weight of the undried filter cake alumina precipitate. An X-ray study of a sample of the dried alumina hydrate indicated that of the portion thereof measurable by an X-ray diffractometer approximately 50 percent of the crystallite sizes were of the larger bayerite form and approximately 50% of the boehmite form.

The alumina hydrogel, after the washings and filterings was subject to slurrying in water to provide a spray drying formation of microspheres in a 5 ft. diameter pilot plant sized spray drier. The latter utilizes approximately 1000° F. heated air introduced co-currently with the charge. The air leaves the spray drier at about 300° F. to 350° F. such that the heat absorbed by the particles is dissipated in the evaporation of entrained water content and there is no change in the crystallite structure of the particles. The resulting collected spray dried microspheres were subsequently calcined at approximately 1500° F. and then subjected to nickel impregnation. In the impregnation step, the microspheres of alumina were contacted with a nickel nitrate solution to provide a resulting approximately 20% nickel content, by weight of the composite, after drying and calcining at approximately 1200° F. for a two hour period.

In order to determine the hardness of the particles and their resistance to attrition when used under fluidized operating conditions, a portion of the particles were subjected to a standard 42 hour attrition test. The apparatus for the attrition test embodies an approximately 27" long by 1½" I.D. lower tube with a perforate disc at the bottom, an enlarged upper 22" long by 5" I.D. (internal diameter) chamber, and an overhead fines collecting flask. An air jet stream, with a velocity of about 890 feet per second passes upwardly through a 45 gram catalyst sample in the lower tube and effects fluidization and attrition of the catalyst particles as they collide with each other. The weight percent recovery of fines collected in the overhead flask at the end of 12 hours of operation is determined as one measure for comparison purposes. Also, the average hourly rate of fines production for the next 30 hours (from 12 to 42 hours) is calculated to provide another evaluation guide.

The nickel impregnated catalyst of the present example, when subjected to the aforedescribed 42 hour attrition test provided an initial fines loss of 12.4%, by weight, at the end of the first 12 hours of attrition testing, and an average hourly rate of fines production equal to 0.12% for the 12 to 42 hour period.

*Example IV*

In another instance, an alumina gel precipitate was prepared by room temperature precipitation of aluminum chloride with ammonium hydroxide in a manner similar to that set forth in the aforedescribed Example III. However, the precipitate in this case was subjected to only three separate stirrings and washings with weakly ammoniated water to effect purification and partial removal of chloride ions from the alumina hydrogel. The alumina hydrogel filter cake material, after the three separate washings was found to have 93.2% volatile matter and 0.26% chlorine. An X-ray study of a sample of the dried alumina filter cake indicated that the alumina was of a type having a small crystallite size of approximately 24 Angstroms and in the pseudoboehmite state.

The catalyst of this example was subjected to nickel nitrate impregnation and calcination in accordance with the steps of Example III to also provide a resulting catalyst of approximately 20% nickel content by weight of the composite. The finished catalyst was also subjected to a 42 hour attrition test providing results showing an initial fines loss after 12 hours of 4.5% and an average hourly rate of fines production for the 12 to 42 hour period of 0.04%.

It will be noted, upon comparing the attrition rates for this latter catalyst with the catalyst of Example III, that in each instance the attrition was only about one-third (⅓) that of the catalyst of Example III. In other words it appears that the increased chlorine content in the alumina hydrogel as prepared for charge to the spray drier effected a retardation of the crystallite growth and was sufficient to maintain the alumina in the pseudoboehmite form at the time of spray drying whereby subsequent calcining or heating and aging permitted completion of crystal growth to the gamma form of alumina and to a desired resulting hardness from the spray drying production.

*Example V*

In this example an alumina gel precipitate was prepared from an aluminum chloride solution in a manner similar to that set forth in the previous examples. Again, the hydrogel precipitate was subjected to a plurality of washing and filtering steps with ammoniacal water to effect a partial removal of the chlorine ions therefrom. The washed alumina hydrogel was then slurried with water for charge to the spray drier, in the manner heretofore described in the preceding examples, to provide resulting finely divided microspheres suitable for a catalyst base after calcining. An X-ray diffractometer study of the microspheres, made prior to calcination, showed that such spheres were in the pseudoboehmite state having a small crystallite size of approximately 26 Angstroms. Also, analysis of the spheres showed volatile matter to be 70.5% by weight thereof. The micropheres were subsequently impregnated with a nickel nitrate solution to provide a resulting composite having approximately 10% nickel, by weight thereof, after washing and calcining at 1550° F.

Finished catalyst upon being subjected to the 42 hour attrition test provided results showing an initial fines loss after 12 hours of 4.6% and an average hourly rate of fines production for the 12 to 42 hour period of 0.09%.

*Example VI*

In this example a commercially obtained finely divided alumina material, generally referred to as Alcoa C-31 alumina, was utilized as a catalyst base for nickel impregnation. An X-ray study of the C–31 particles indicated that the material was primarily of the gibbsite form (gamma-$Al_2O_3 \cdot 3H_2O$) with large crystallite sizes.

The material was subsequently calcined and impregnated with a nickel nitrate solution to provide 11.6% weight nickel by weight of the washed, dried and calcined finished product. Also, the finished catalyst was subjected to a 42 hour attrition test providing results showing an initial fines loss after 12 hours of 28% and an average hourly rate of fines production for the 12 to 42 hour period of 0.86%.

Here again, it may be noted that the alumina in the pseudoboehmite state at the time of comminution provided a resulting hard attrition resistant catalyst, while in comparison, the catalyst particles prepared from the C–31 (gibbsite alumina) had no satisfactory hardness or attrition resistance for use in a fluidized operation since the fines losses were greater than that permissible for an acceptable continuously operating unit.

I claim as my invention:

1. In a process for producing hydrogen by the fluidized contacting of a normally gaseous hydrocarbon stream at decomposition conditions with a subdivided catalyst composite, the improved processing operation for obtaining an optimum conversion of said stream, which comprises, contacting such stream with a fluidized composite which consists of nickel activated attrition resistant essentially alumina base particles of a spray-dried pseudoboehmite form of an alumina precipitate containing from about 0.20 to about 0.30 percent by weight of an acid ion from the group consisting of chloride and nitrate ions.

2. The process of claim 1 further characterized in that said acid ions are chloride ions.

3. The process of claim 1 further characterized in that said acid ions are nitrate ions.

References Cited

UNITED STATES PATENTS

| | | | |
|---|---|---|---|
| 2,894,900 | 7/1959 | Hemminger | 23—143 X |
| 2,904,608 | 9/1959 | Holm et al. | 252—466 X |
| 2,911,288 | 11/1959 | Viles | 23—212 |
| 2,988,520 | 6/1961 | Braithwaite | 252—455 |
| 3,120,495 | 2/1964 | Innes | 252—466 X |
| 3,129,060 | 4/1964 | Pohlenz | 23—212 |
| 3,188,174 | 6/1965 | Kehl et al. | 252—466 X |
| 3,193,349 | 7/1965 | Mooi | 252—466 X |
| 3,197,284 | 7/1965 | Hoekstra | 23—212 |
| 3,202,480 | 8/1965 | Nixon | 23—2.1 X |

OTHER REFERENCES

Bulletin de la Societe Chimique de France (1958), pages 1301–1310, article by Denis Papee et al. entitled: Recherches sur la Constitution des Gels et des Hydrates Crystallisis d'Alumine.

OSCAR R. VERTIZ, *Primary Examiner.*

B. LEVENSON, *Assistant Examiner.*